(12) United States Patent
Yamazaki et al.

(10) Patent No.: US 8,920,080 B2
(45) Date of Patent: Dec. 30, 2014

(54) MACHINE TOOL

(75) Inventors: Kazuo Yamazaki, El Macero, CA (US);
Toru Fujimori, Yamatokoriyama (JP)

(73) Assignees: DMG Mori Seiki Co., Ltd., Nara (JP);
Intelligent Manufacturing Systems International, San Francisco, CA (US)

( * ) Notice: Subject to any disclaimer, the term of this patent is extended or adjusted under 35 U.S.C. 154(b) by 922 days.

(21) Appl. No.: 13/070,870

(22) Filed: Mar. 24, 2011

(65) Prior Publication Data

US 2012/0243956 A1    Sep. 27, 2012

(51) Int. Cl.
*B23C 1/06* (2006.01)
*B23Q 17/22* (2006.01)
*G05B 19/402* (2006.01)
*G05B 19/404* (2006.01)
*B23C 1/00* (2006.01)

(52) U.S. Cl.
CPC ........ *G05B 19/404* (2013.01); *B23Q 2717/006* (2013.01); *B23C 1/06* (2013.01); *B23C 2250/00* (2013.01); *B23C 2260/48* (2013.01); *B23Q 17/225* (2013.01); *B23C 1/002* (2013.01); *B23C 2260/76* (2013.01); *B23Q 17/2233* (2013.01); *B23Q 17/22* (2013.01); *G05B 2219/37024* (2013.01); *G05B 2219/42318* (2013.01)
USPC ........... 409/212; 409/187; 409/188; 409/208; 408/13; 451/5; 451/9; 451/10; 700/193

(58) Field of Classification Search
CPC ............ G05B 2219/42318; G05B 2219/37024
USPC .............. 408/8, 13, 16, 69, 91; 409/202, 212, 409/186, 187, 188, 193, 194, 195, 207, 208, 409/235; 82/1.11; 318/567; 700/121, 96, 700/117, 193; 451/5, 8, 9, 10
See application file for complete search history.

(56) References Cited

U.S. PATENT DOCUMENTS

| | | | | | |
|---|---|---|---|---|---|
| 4,631,834 | A | * | 12/1986 | Hayashi et al. | 33/503 |
| 4,996,762 | A | * | 3/1991 | Takayama | 483/49 |
| 5,933,933 | A | * | 8/1999 | Fritz et al. | 29/33 P |
| 6,048,143 | A | * | 4/2000 | Chang et al. | 409/201 |
| 6,681,146 | B2 | * | 1/2004 | Kawase et al. | 700/193 |
| 2001/0041651 | A1 | * | 11/2001 | Abe et al. | 483/3 |
| 2006/0085959 | A1 | * | 4/2006 | Yang | 29/26 A |

FOREIGN PATENT DOCUMENTS

| | | | |
|---|---|---|---|
| JP | 2008-114322 | | 5/2008 |
| JP | 2008-114322 A | * | 5/2008 |

\* cited by examiner

*Primary Examiner* — Erica E Cadugan
(74) *Attorney, Agent, or Firm* — WPAT, P.C.; Anthony King (57) ABSTRACT

A machine tool 1 comprises a bed 11, a column 12, a spindle head 15, a spindle 16, a saddle 17, a table 18, a feed mechanism for moving the spindle head 15, the saddle 17 and the table 18 in Z-axis, Y-axis and X-axis directions respectively, a position detector for detecting the positions of the spindle head 15, saddle 17 and table 18, a controller for feedback controlling the feed mechanism, a position detector 51 for detecting the position of the spindle head 15, a position detector 54 for detecting the position of the spindle head 15, a position detector 57 for detecting the position of the table 18, and a measurement frame 50 which is configured with a different member from the bed 11 and the column 12 and on which readers 53, 56, 59 of the position detectors 51, 54, 57 are disposed.

6 Claims, 7 Drawing Sheets

MACHINE TOOL

TECHNICAL FIELD

The present invention relates to a machine tool having another position detector in addition to a position detector for feedback control of moving positions of a tool and a workpiece.

BACKGROUND ART

In a machine tool, conventionally, moving positions of a tool and a workpiece are feedback controlled. As an example thereof, for example, there is a machine tool as disclosed in the Japanese Unexamined Patent Application Publication No. 2008-114322.

This machine tool has a base, a table which is provided on the base to be movable in an X-axis direction being a horizontal direction and to which a workpiece is mounted, a column which is provided on the base to be movable in a Z-axis direction being a horizontal direction perpendicular to the X-axis direction, a spindle head which is provided on the column to be movable in a Y-axis direction being the vertical direction, a spindle which is supported by the spindle head and to which a tool is mounted, an X-axis feed mechanism for moving the table in the X-axis direction using an X-axis motor, a Z-axis feed mechanism for moving the column in the Z-axis direction using a Z-axis motor, a Y-axis feed mechanism for moving the spindle head in the Y-axis direction using a Y-axis motor, an X-axis position detector for detecting the position of the table in the X-axis direction, a Z-axis position detector for detecting the position of the column in the Z-axis direction, a Y-axis position detector for detecting the position of the spindle head in the Y-axis direction, and a controller for feedback controlling the X-axis, Z-axis and Y-axis feed mechanisms on the basis of target moving positions of the table, column and spindle head in the X-axis, Z-axis and Y-axis directions respectively and the positions thereof detected by the X-axis, Z-axis and Y-axis position detectors, and moving the table, the column and the spindle head to their respective target moving positions.

The X-axis position detector comprises an X-axis scale having graduations In the X-axis direction and an X-axis reader for reading the graduations of the X-axis scale, the Z-axis position detector comprises a Z-axis scale having graduations in the Z-axis direction and a Z-axis reader for reading the graduations of the Z-axis scale, and the Y-axis position detector comprises a Y-axis scale having graduations in the Y-axis direction and a Y-axis reader for reading the graduations of the Y-axis scale. The X-axis and Z-axis scales are provided on the base and the Y-axis scale is provided on the column, and the X-axis, Z-axis and Y-axis readers are provided on the table, the column and the spindle head, respectively.

SUMMARY OF INVENTION

Technical Problem

However, in the above-described conventional machine tool in which the positions of the table, column and spindle head are detected by the scales and readers attached to the machine tool structures such as the base, the table, the column and the spindle head, it is not possible to detect the accurate positions of the table, column and spindle head because the positions in three-dimensional space of the readers or the positional relationship between the readers are changed due to elastic deformation and thermal deformation caused by the self-weight of the machine tool structures and external forces and the detection values detected by the position detectors therefore include errors.

Because of this reason, even though, for example, a measuring head replaces the tool and is mounted to the spindle and a measuring probe thereof is approached to a machined workpiece fixed on the table and is brought into contact with the workpiece, and the positions of the table, column and spindle head in the X-axis, Z-axis and Y-axis directions respectively at the time when the measuring probe is brought into contact with the workpiece are detected by the X-axis, Z-axis and Y-axis position detectors to calculate the shape accuracy of the workpiece on the basis of the detected positions, an accurate on-machine measurement cannot be achieved.

Further, even though, in addition to the calculation of the shape accuracy of the workpiece, moving positions of the table, column and spindle head in the X-axis. Z-axis and Y-axis directions respectively for machining a workpiece are corrected on the basis of the calculated shape accuracy of the workpiece, similarly, a highly accurate correction cannot be achieved.

The present invention has been achieved in view of the above-described circumstances, and an object thereof is to provide a machine tool capable of detecting the accurate positions of a tool and a workpiece.

Solution to Problem

The present invention, for achieving the above-described object, relates to a machine tool comprising:

tool mounting means to which a tool is mounted;

workpiece mounting means to which a workpiece is mounted;

first support means for supporting the tool mounting means and the workpiece mounting means to be movable in three orthogonal directions;

feed means for moving the tool mounting means and the workpiece mounting means in the three orthogonal directions;

first position detecting means for detecting the positions of the tool mounting means and workplace mounting means in the three orthogonal directions; and control means for feedback controlling the feed means on the basis of target moving positions of the tool mounting means and workpiece mounting means in the three orthogonal directions and the positions thereof detected by the first position detecting means to move the tool mounting means and the workpiece mounting means to their respective target moving positions, the machine tool further comprising:

second support means provided separately from the first support means; and second position detecting means having at least two sets of scale and reader and detecting the positions of the tool mounting means and workpiece mounting means in the three orthogonal directions, the scales being provided on movable means of the tool mounting means and the workpiece mounting means, and the readers being provided on the second support means and reading graduations of the scales.

According to the invention, the feed means is feedback controlled by the control means on the basis of the target moving positions of the tool mounting means and workpiece mounting means in the three orthogonal directions and the positions thereof detected by the first position detecting means, and thereby the tool mounting means and the workpiece mounting means are moved to their respective target moving positions. Further, the positions of the tool mounting means and workpiece mounting means in the three orthogonal directions are detected by the second position detecting means.

For the second position detecting means, any means which is capable of detecting positions in three orthogonal directions may be employed. For example, position in three orthogonal directions can be detected by means of a set of scale and reader, which set is capable of detecting positions in two orthogonal directions and a set of scale and reader, which set is capable of detecting a position only in one direction, by means of three sets of scale and reader, each of which sets is capable of detecting a position only in one direction, or by means of three sets of scale and reader, each of which sets is capable of detecting positions in two orthogonal directions.

In the present invention, the readers of the second position detecting means are provided on the second support means which is separate from the first support means supporting the tool mounting means and the workpiece mounting means. Therefore, even if the first support means undergoes elastic deformation or thermal deformation due to its self-weight or external forces, the second support means is hardly affected by the deformation and it is therefore possible to prevent the positions in three-dimensional space of the readers and the positional relationship between the readers from being changed. Therefore, with this second position detecting means, it is possible to prevent errors from occurring in detection values detected by the second position detecting means, and thereby, the positions of the tool mounting means and workpiece mounting means (tool and workpiece) in the three orthogonal directions can be accurately detected.

Therefore, for example, by comparing the positions of the tool mounting means and workpiece mounting means detected by the second position detecting means with the target moving positions thereof or the positions thereof detected by the first position detecting means, motion errors of the tool mounting means and workpiece mounting means can be analyzed with high accuracy.

Further, at the time of machining a workpiece, correcting, when moving the tool mounting means and the workpiece mounting means in the three orthogonal directions, the positions of the tool mounting means and workpiece mounting means, such as the detection values detected by the first position detecting means, on the basis of the analyzed motion errors leads to the workpiece being machined with high accuracy.

Furthermore, when a measuring head replaces the tool and is mounted to the tool mounting means and a measuring probe thereof is approached to a machined workpiece being mounted to the workplace mounting means and is brought into contact with the workpiece, and the positions of the tool mounting means and workpiece mounting means in the three orthogonal directions at the time when the measuring probe is brought into contact with the workpiece are detected by the first position detecting means to calculate the shape accuracy of the workpiece on the basis of the positions detected by the first position detecting means, correcting the detection values detected by the first position detecting means on the basis of the analyzed motion errors leads to on-machine measurement being performed with high accuracy.

The machine tool may be configured as follows: the first support means comprises a bed and a portal column fixedly provided on the bed, the column having a pair of posts provided on either side of the bed respectively and a cross beam extending between the pair of posts; the tool mounting means comprises a spindle head provided on the cross beam to be movable in a first axis direction being the vertical direction and a spindle which is supported by the spindle head in such a manner that its axis is parallel to the first axis direction and to which a tool is mounted; the workplace mounting means comprises a saddle provided on the bed to be movable in a second axis direction being a horizontal direction and a table which is provided on the saddle to be movable in a third axis direction being a horizontal direction perpendicular to the second axis direction and to which a workpiece is mounted; the feed means is configured to move the spindle head, the saddle and the table in the first, second and third axis directions respectively; the first position detecting means is configured to detect the position of the spindle head in the first axis direction, the position of the saddle in the second axis direction and the position of the table in the third axis direction; the control means is configured to feedback control the feed means on the basis of target moving positions of the spindle head, saddle and table in the first, second and third axis directions respectively and the positions thereof detected by the first position detecting means to move the spindle head, the saddle and the table to their respective target moving positions; the saddle has a through hole passing therethrough in the vertical direction within a moving area of the table; the second support means is configured with a rectangular and frame-shaped member and is disposed on the bed and the column in such a manner that its vertical edges and lateral edges extend along the first axis direction and along the longitudinal direction of the cross beam respectively and the saddle and the table are positioned within the frame; and the second position detecting means comprises a first scale having graduations in the first axis direction and provided on the spindle head, a second scale having graduations in the second axis direction and in the third axis direction and provided on the lower surface of the table, a first reader provided on the second support means in the vicinity of the spindle head, and reading the graduations of the first scale, and a second reader provided on the second support means at a portion thereof corresponding to the through hole below the table, and reading the graduations of the second scale.

In this case, the feed means is feedback controlled by the control means on the basis of the target moving positions of the spindle head, saddle and table in the first, second and third axis directions respectively and the positions thereof detected by the first position detecting means, and thereby, the spindle head, the saddle and the table are moved to their respective target moving positions. Further, the position of the spindle head in the first axis direction is detected by the first scale and reader of the second position detecting means, and the position of the saddle in the second axis direction and the position of the table in the third axis direction are detected by the second scale and reader of the second position detecting means.

Further, in this case, since the first reader and the second reader are provided on the same member (rectangular and frame-shaped member), it is possible to easily and accurately recognize the positional relationship between the readers, and therefore, the positions of the spindle head, saddle and table can be detected with higher accuracy.

Furthermore, the scales and the readers are preferably disposed in the vicinity of a cutting point that is a contact point between the tool and the workpiece, and disposing them in the vicinity of the cutting point leads to position detection being performed more accurately compared with when they are disposed away from the cutting point.

Furthermore, the second reader is preferably disposed just below the spindle, and disposing it just below the spindle leads to a higher degree of position detection accuracy compared with when it is disposed at a position other than just below the spindle.

The second position detecting means may be configured with three sets of scale and reader, the three sets of scale and reader comprising a first scale having graduations in the first axis direction and in the second axis direction and provided on the spindle head, a second scale having graduations in the second axis direction and in the third axis direction and provided on the lower surface of the table, a third scale having graduations in the first axis direction and in the third axis direction and provided on the spindle head, a first reader provided on the second support means in the vicinity of the spindle head and reading the graduations of the first scale, a second reader provided on the second support means at a portion thereof corresponding to the through hole below the table and reading the graduations of the second scale, and a third reader provided on the second support means in the vicinity of the spindle head and reading the graduations of the third scale.

In this case, the position in the first axis direction and the position in the second axis direction of the spindle head are detected by the first scale and reader, the position in the first direction and the position in the third axis direction of the spindle head are detected by the third scale and reader, and the position in the second direction and the position in the third axis direction of the table are detected by the second scale and reader. On the basis of two detection values for each direction (six values in total) detected in this manner, the position detection can be performed with higher accuracy.

Further, the second support means is preferably configured with a member having a coefficient of linear expansion of $1.5 \times 10^{-6}/°C$. In this way, even if atmosphere temperature is changed or heat is transmitted from heat sources of the machine tool (such as a bearing, a motor etc.), thermal displacement of the second support means can be suppressed to a very slight displacement, and it is therefore possible to prevent the positions in three dimensional space of the readers and the positional relationship between the readers from being changed. As a result, it is possible to prevent the detection accuracy of the second position detecting means from being lowered.

Advantageous Effects of Invention

As described above, according to the machine tool of the present invention, it is possible to detect the accurate positions of the tool and workpiece since the readers of the second position detecting means are provided on the second support means and is therefore separated from the tool mounting means, the workpiece mounting means and the first support means.

DESCRIPTION OF EMBODIMENTS

Hereinafter, a specific embodiment of the present invention will be described with reference to the accompanying drawings.

As shown in FIGS. 1 to 5, a machine tool 1 of the embodiment comprises a rectangular bed 11, a portal column 12 fixedly provided on the bed 11, a spindle head 15 provided on the column 12 to be movable in a Z-axis direction being the vertical direction, a spindle 16 which is supported by the spindle head 15 in such a manner that its axis is parallel to the Z-axis direction and it is rotatable about its axis and to the lower end of which a tool T is mounted, a saddle 17 provided on the bed 11 to be movable in a Y-axis direction being a horizontal direction, a table 18 which is provided on the saddle 17 to be movable in an X-axis direction being perpendicular to both the Y-axis and Z-axis directions and on which a workpiece W is mounted, a Z-axis feed mechanism for moving the spindle head 15 in the Z-axis direction, a Y-axis feed mechanism for moving the saddle 17 in the Y-axis direction, an X-axis feed mechanism for moving the table 18 in the X-axis direction, a Z-axis position detector 30 for detecting the position of the spindle head 15 in the Z-axis direction, a Y-axis position detector 33 for detecting the position of the saddle 17 in the Y-axis direction, an X-axis position detector 36 for detecting the position of the table 18 in the X-axis direction, and a controller 40 for controlling the operations of the feed mechanisms.

Further, the machine tool 1 further comprises an X-Z position detector 51 for detecting the position in the X-axis direction and the position in the Z-axis direction of the spindle head 15, a Y-Z position detector 54 for detecting the position in the Y-axis direction and the position in the Z-axis direction of the spindle head 15, an X-Y position detector 57 for detecting the position of the saddle 17 in the Y-axis direction and the position of the table 18 in the X-axis direction (that is, the position in the X-axis direction and the position in the Y-axis direction of the table 18), and a measurement frame (second support means) 50 which is provided separately from the bed 11 and the column 12 and on which readers 53, 56, 59 being components of the position detectors 51, 54, 57 respectively are disposed. The readers 53, 56, 59 will be described later.

It is noted that the bed 11 and column 12 function as the first support means recited in the claims, the spindle head 15 and spindle 16 function as the tool mounting means recited in the claims, the saddle 17 and table 18 function as the workpiece mounting means recited in the claims, the Z-axis, Y-axis and X-axis position detectors 30, 33, 36 function as the first position detecting means recited in the claims, and the X-Z, Y-Z and X-Y position detectors 51, 54, 57 function as the second position detecting means recited in the claims.

The bed 11 has a groove 11a which is formed in the X-axis direction and opens at the top face of the bed 11. The column 12 comprises a pair of posts 13 disposed upright on either side of the bed 11 in the X-axis direction respectively and a cross beam 14 extending parallel to the X-axis direction between the upper portions of the posts 13. Each of the posts 13 has a groove 13a which is formed in the Z-axis direction and opens at the face facing the other. The lower end of each groove 13a is connected to the groove 11a. Meanwhile, the cross beam 14 has a through hole 14a which is formed at a middle portion in the longitudinal direction of the cross beam 14 and passes through the cross beam 14 in the vertical direction, and has a groove 14b on each side of the through hole 14a in the X-axis direction, which groove is formed in the X-axis direction and opens at the lower face of the cross beam 14. The ends of each groove 14b are connected to the through hole 14a and to one of the grooves 13a, respectively.

Figure 1:
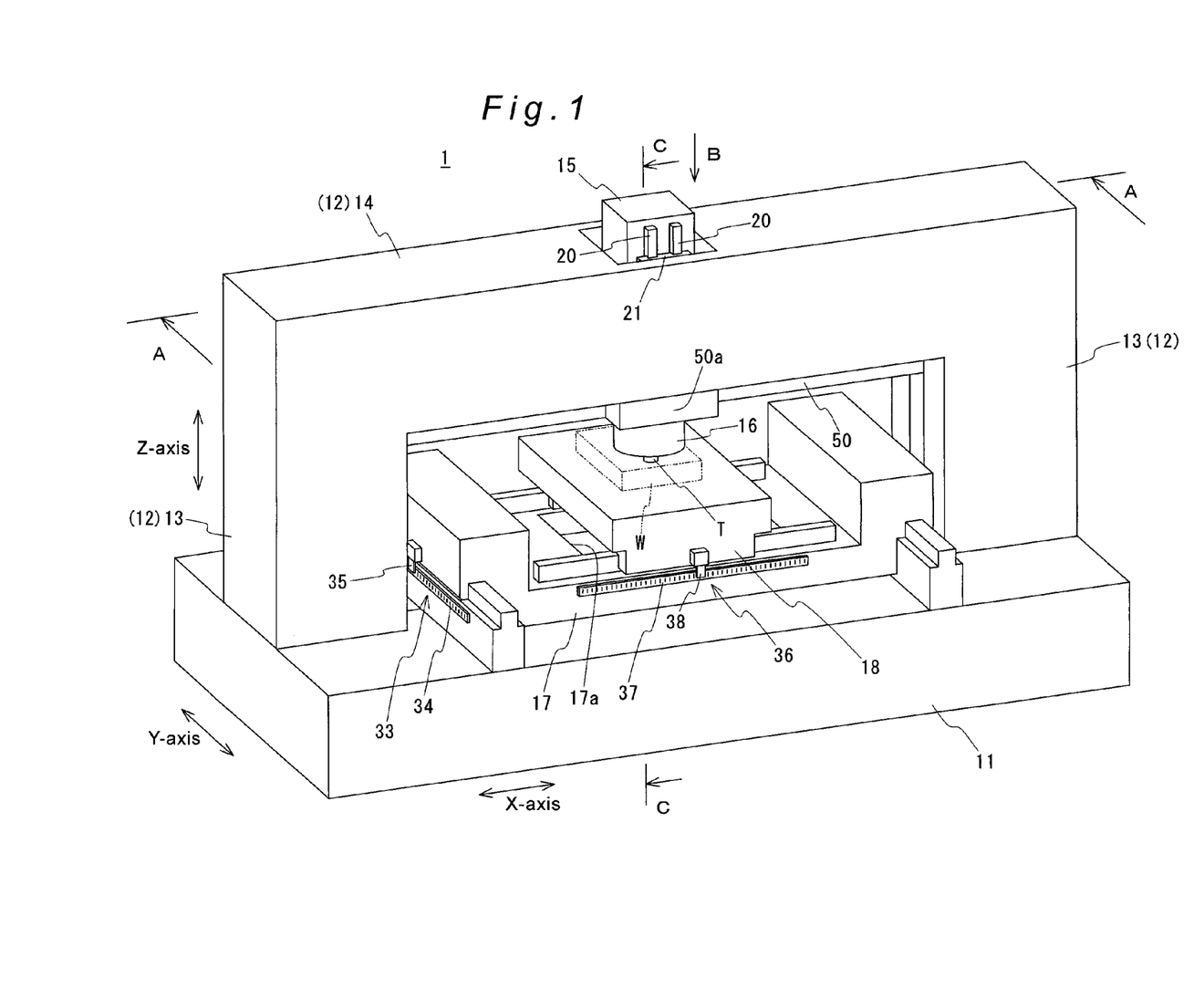
FIG. 1 is a perspective view showing a schematic configuration of a machine tool according to one embodiment of the present invention.
Figure 2:
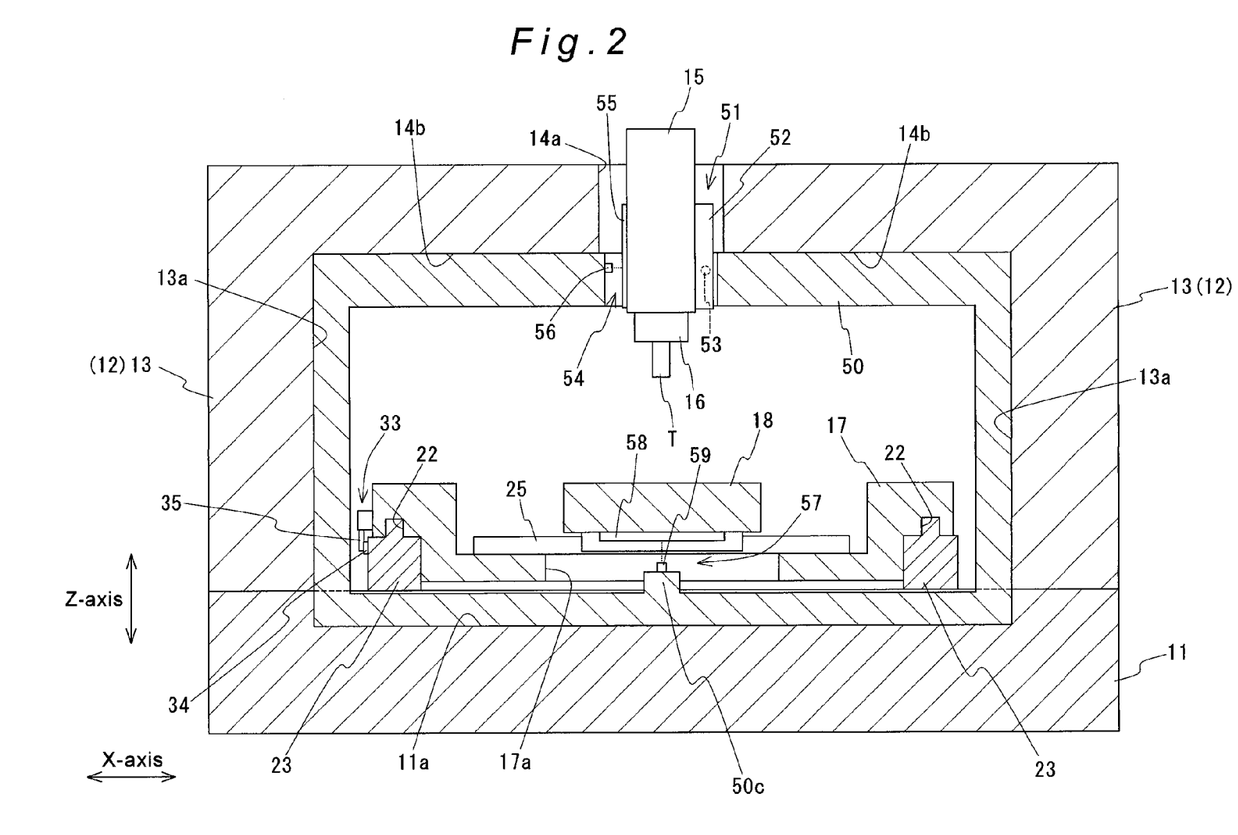
FIG. 2 is a sectional view taken along line A-A in FIG. 1.
Figure 3:
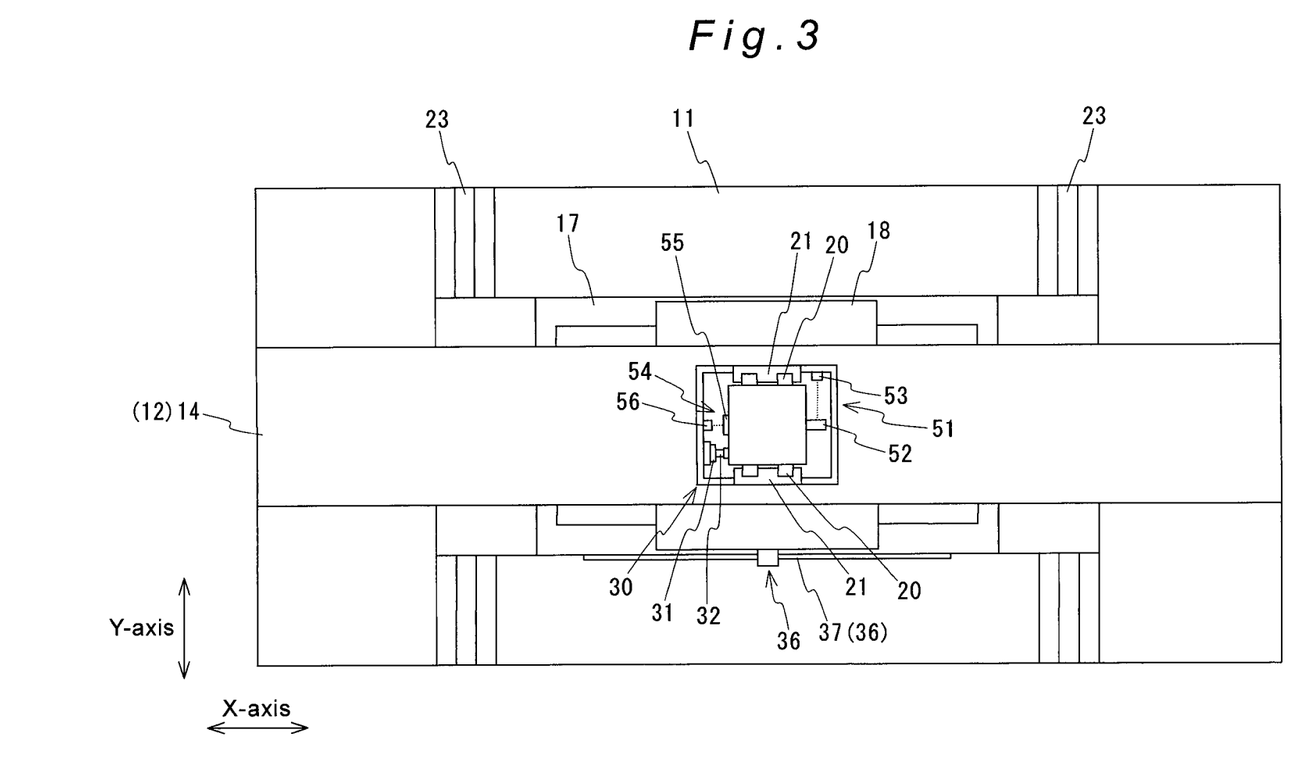
FIG. 3 is a plan view taken in the direction of arrow B in FIG. 1.
Figure 4:
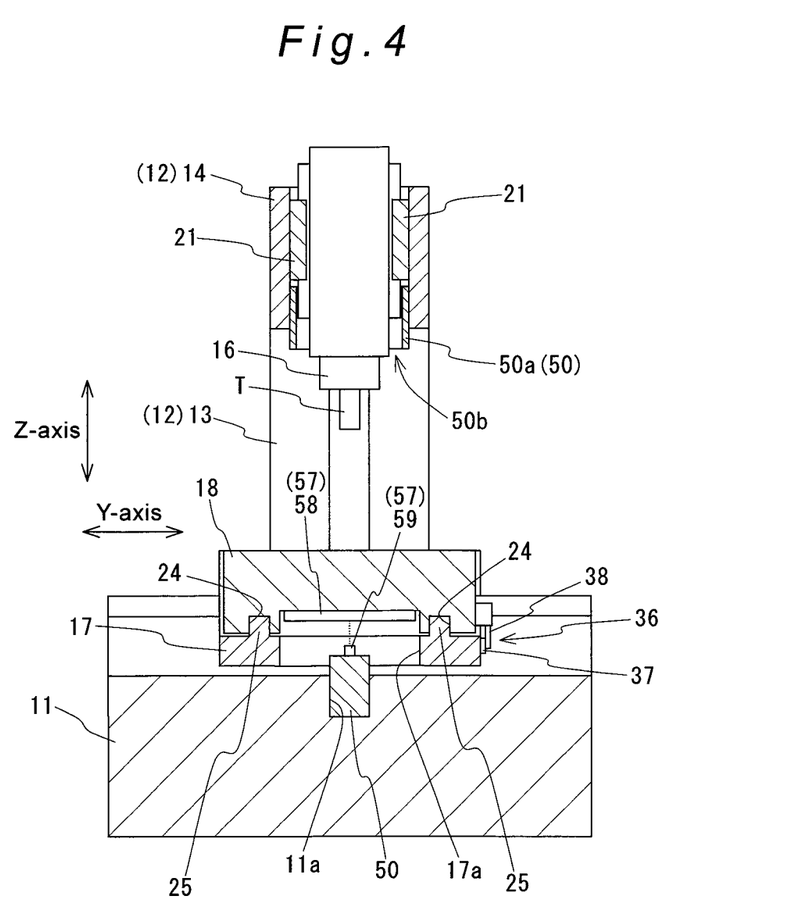
FIG. 4 is a sectional view taken along line C-C in FIG. 1.

The spindle head 15 is arranged within the through hole 14a of the cross beam 14, and is guided by an engagement relationship between a guide member 20 provided on the outer peripheral surface of the spindle head 15 and a guide member 21 provided on the inner peripheral surface of the through hole 14a and is thereby moved in the Z-axis direction.

The saddle 17 is formed into a rectangular shape having its longitudinal direction in the X-axis direction, and has a rectangular through hole 17a which is formed at a middle portion in the longitudinal direction of the saddle 17 and passes through the saddle 17 in the vertical direction, which middle portion is located within the moving area of the table 18. The saddle 17 is guided by an engagement relationship between a guide portion 22 formed on the lower surface thereof and a guide member 23 provided on the top surface of the bed 11 and is thereby moved in the Y-axis direction. The table 18 is guided by an engagement relationship between a guide portion 24 formed on the lower surface thereof and a guide portion 25 formed on the top surface of the saddle 17 and is thereby moved in the X-axis direction.

The Z-axis feed mechanism has a Z-axis drive motor 26, a Z-axis ball screw to be rotated by the Z-axis drive motor 26, and a Z-axis nut screwed onto the Z-axis ball screw, and driving of the Z-axis drive motor 26 causes the movement of the spindle head 15 in the Z-axis direction. The Y-axis feed mechanism has a Y-axis drive motor 27, a Y-axis ball screw to be rotated by the Y-axis drive motor 27, and a Y-axis nut screwed onto the Y-axis ball screw, and driving of the Y-axis drive motor 27 causes the movement of the saddle 17 in the Y-axis direction. The X-axis feed mechanism has an X-axis drive motor 28, an X-axis ball screw to be rotated by the X-axis drive motor 28, and an X-axis nut screwed onto the X-axis ball screw, and driving of the X-axis drive motor 28 causes the movement of the table 18 in the X-axis direction.

Figure 5:
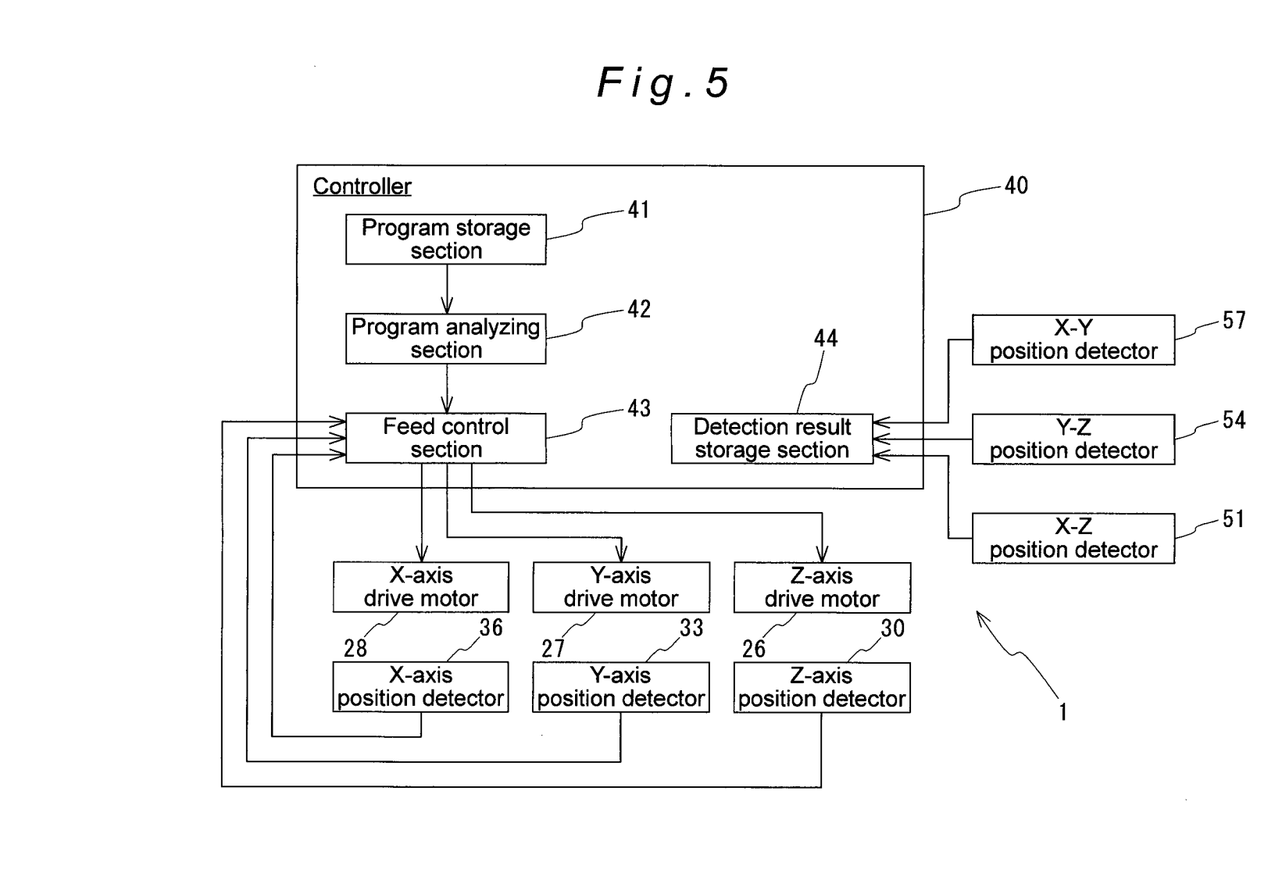
FIG. 5 is a block diagram showing a schematic configuration of a controller, position detectors and other components according to the embodiment.

The Z-axis, Y-axis and X-axis position detectors 30, 33, 36 are each configured with a linear encoder and transmit the detected positions to the controller 40.

The Z-axis position detector 30 comprises a Z-axis scale 31 which is provided along the Z-axis direction on the inner peripheral surface of the through hole 14a and has graduations in the Z-axis direction, and a Z-axis reader 32 which is provided on the outer peripheral surface of the spindle head 15 to face the Z-axis scale 31 and reads the graduations of the Z-axis scale 31.

The Y-axis position detector 33 comprises a Y-axis scale 34 which is provided along the Y-axis direction on a side surface of the guide member 23 of the bed 11 and has graduations in the Y-axis direction, and a Y-axis reader 35 which is provided on a side surface of the saddle 17 to face the Y-axis scale 34 and reads the graduations of the Y-axis scale 34.

The X-axis position detector 36 comprises an X-axis scale 37 which is provided along the X-axis direction on a side surface of the saddle 17 and has graduations in the X-axis direction, and an X-axis reader 38 which is provided on a side surface of the table 18 to face the X-axis scale 37 and reads the graduations of the X-axis scale 37.

The controller 40 has a program storage section 41 in which a previously generated NC program is stored, a program analyzing section 42 for analyzing the NC program stored in the program storage section 41 and extracting operation commands relating to moving positions of the spindle head 15, saddle 17 and table 18, a feed control section 43 for generating target moving positions of the spindle head 15, saddle 17 and table 18 in the Z-axis, Y-axis and X-axis directions respectively on the basis of the operation commands extracted by the program analyzing section 42, and feedback controlling the Z-axis, Y-axis and X-axis drive motors 26, 27, 28 on the basis of the generated target moving positions and the positions transmitted from the Z-axis, Y-axis and X-axis position detectors 30, 33, 36 (the positions read by the Z-axis, Y-axis and X-axis readers 32, 35, 38) to move the spindle head 15, the saddle 17 and the table 18 to their respective target moving positions, and a detection result storage section 44 in which detection results of the X-Z, Y-Z and X-Y position detectors 51, 54, 57 are stored.

The measurement frame 50 is configured with a rectangular and frame-shaped member and is provided in such a manner that its lateral edges (upper and lower edges) extend parallel to the X-axis direction and its vertical edges extend parallel to the Z-axis direction, and the saddle 17 and the table 18 are positioned within the hollow portion of the frame. At a middle portion in the X-axis direction of the upper edge of the measurement frame 50, a hollow pipe portion 50a is formed to open at the top and at the bottom. An inner space 50b of the pipe portion 50a communicates with the through hole 14a of the cross beam 14. Further, at a middle portion in the X-axis direction of the lower edge of the measurement frame 50, a protrusion 50c is formed to protrude toward the upper edge. The protrusion 50c is positioned below the table 18 within the through hole 17a of the saddle 17.

The edges of the measurement frame 50 are held and arranged in the groove 11a of the bed 11, the grooves 13a of the posts 13 and the grooves 14b of the cross beam 14, and the pipe portion 50a is held and arranged in the lower portion of the through hole 14a. The measurement frame 50 is preferably configured with a different member from the structures such as the bed 11, the column 12, the spindle head 15, the saddle 17 and the table 18, and made from a material having a low coefficient of linear expansion (at least lower than those of the above-mentioned structures), for example, a coefficient of linear expansion equal to or less than $1.5 \times 10^{-6}/°$ C. Such a material includes, for example, glass ceramic.

The X-Z, Y-Z and X-Y position detectors 51, 54, 57 are each configured with a laser position detector, and positions detected by them (positions read by the readers 53, 56, 59) are stored in the detection result storage section 44.

The X-Z position detector 51 comprises an X-Z scale 52 having graduations in a lattice manner in the X-axis and Z-axis directions and an X-Z reader 53 reading the graduations of the X-Z scale 52, and the X-Z scale 52 is disposed parallel to an X-Z plane on the outer peripheral surface of the spindle head 15 at a portion thereof near the lower end of the spindle head 15 and the X-Z reader 53 is disposed on the inner peripheral surface of the pipe portion 50a of the measurement frame 50 to face the X-Z scale 52. The arrangement of the X-Z scale 52 near to the lower end of the spindle head 15 leads to the X-Z scale 52 being arranged in the vicinity of a cutting point that is a contact point between the tool T and the workpiece W and the X-Z reader 53 being thereby arranged on the measurement frame 50 at a portion thereof in the vicinity of the cutting point.

The Y-Z position detector 54 comprises a Y-Z kale 55 having graduations in a lattice manner in the Y-axis and Z-axis directions and a Y-Z reader 56 reading the graduations of the Y-Z scale 55, and the Y-Z scale 55 is disposed parallel to a Y-Z plane on the outer peripheral surface of the spindle head 15 at a portion thereof near the lower end of the spindle head 15 and the Y-Z reader 56 is disposed on the inner peripheral surface of the pipe portion 50a of the measurement frame 50 to face the Y-Z scale 55. Similarly to the X-Z scale 52 and the X-Z reader 53, the Y-Z scale 55 and the Y-Z reader 56 are also arranged in the vicinity of the cutting point.

The X-Y position detector 57 comprises an X-Y scale 58 having graduations in a lattice manner in the X-axis and Y-axis directions and an X-Y reader 59 reading the graduations of the X-Y scale 58, and the X-Y scale 58 is disposed parallel to an X-Y plane on the lower surface of the table 18 and the X-Y reader 59 is disposed on the top surface of the protrusion 50c of the measurement frame 50 to face the X-Y scale 58 just below the spindle 16. The provision of the X-Y scale 58 on the lower surface of the table 18 leads to the X-Y scale 58 being arranged in the vicinity of the cutting point and the provision of the X-Y reader 59 just below the spindle 16 leads to the X-V reader 59 being arranged on the measurement frame 50 at a portion thereof in the vicinity of the cutting point.

According to the machine tool 1 of the embodiment thus configured, the feed control section 43 generates target moving positions of the spindle head 15, saddle 17 and table 18 in the Z-axis, Y-axis and X-axis directions respectively and feedback controls the Z-axis, Y-axis and X-axis drive motors 26, 27, 28 on the basis of the generated target moving positions and the positions transmitted from the Z-axis, Y-axis and X-axis position detectors 30, 33, 36, and thereby the spindle head 15, the saddle 17 and the table 18 are moved to their respective target moving positions. In this way, the tool T and the workpiece W are moved in the three orthogonal directions.

Further, the X-Z, Y=Z and X-Y position detectors 51, 54, 57 detect the position in the X-axis direction and the position in the Z-axis direction of the spindle head 15, the position in the Y-axis direction and the position in the Z-axis direction of the spindle head 15 and the position in the X-axis direction and the position in the Y-axis directions of the table 18, respectively, and the detected positions are stored in the detection result storage section 44. On the basis of the data stored in the detection result storage section 44 and the positional relationship between the X-Z, Y-Z and X-Y readers 53, 56, 59 on the measurement frame 50, for example, three-dimensional motions in three-dimensional space of the tool T and workpiece W are recognized.

In the machine tool 1 of the embodiment, as described above, the X-Z, Y-Z and X-Y readers 53, 56, 59 are provided on the measurement frame 50 which is a different member from the structures such as the bed 11, the column 12, the spindle head 15, the saddle 17 and the table 18, for example, and are therefore separated from these structures.

Therefore, even if elastic deformation or thermal deformation of these structures is caused due to their self-weight or external forces, the measurement frame 50 is hardly affected by the deformation, and therefore the positions in three-dimensional space of the X-Z, Y-Z and X-Y readers 53, 56, 59 and the positional relationship between the X-Z, Y-Z and X-Y readers 53, 56, 59 can be prevented from being changed. As a result, it is possible to prevent errors from occurring in the detection values detected by the X-Z, Y-Z and X-Y position detectors 51, 54, 57, and therefore the position in the X-axis direction and the position in the Z-axis direction of the spindle head 15, the position in the Y-axis and the position in the Z-axis direction of the spindle head 15 and the position in the X-axis direction and the position in the Y-axis direction of the table 18 can be accurately detected.

Further, since the X-Z, Y-Z and X-Y readers 53, 56, 59 are provided on the same member, that is, the measurement frame 50, it is possible to easily and accurately recognize the positional relationship between the X-Z, Y-Z and X-Y readers 53, 56, 59, and therefore the positions of the spindle head 15, saddle 17 and table 18 can be detected with higher accuracy.

Furthermore, the X-Z, Y-Z and X-Y scales 52, 55, 58 and the X-Z, Y-Z and X-Y readers 53, 56, 59 are arranged as close to the cutting point as possible, and the arrangement of them close to the cutting point leads to the position detection being performed more accurately compared with when they are arranged away from the cutting point. Further, since the X-Y reader 59 is arranged just below the spindle 16, the position detection accuracy can be higher compared with when it is arranged at a position other than just below the spindle 16.

Furthermore, since the X-Z, Y-Z and X-Y readers 53, 56, 59 each detect positions in two directions, on the basis of two detection values for each direction (6 values in total) detected in this manner, the position detection can be performed with higher accuracy.

Further, when the measurement frame 50 is configured to have a low coefficient of linear expansion, for example, a coefficient of linear expansion equal to or less than $1.5 \times 10^{-6}/°$ C., even if atmosphere temperature is changed or heat is transmitted from heat sources of the machine tool 1 (such as a bearing, a motor etc.), thermal displacement of the measurement frame 50 can be suppressed to a very slight displacement. Therefore, the positions in three-dimensional space of the X-Z, Y-Z and X-Y readers 53, 56, 59 and the positional relationship between the X-Z, Y-Z and X-Y readers 53, 56, 59 can be prevented from being changed, and thereby, it is possible to prevent the detection accuracy of the X-Z, Y-Z and X-Y position detectors 51, 54, 57 from being lowered.

Thus, one embodiment of the present invention has been described. However, a specific mode in which the present invention can be realized is not limited thereto.

Figure 6:
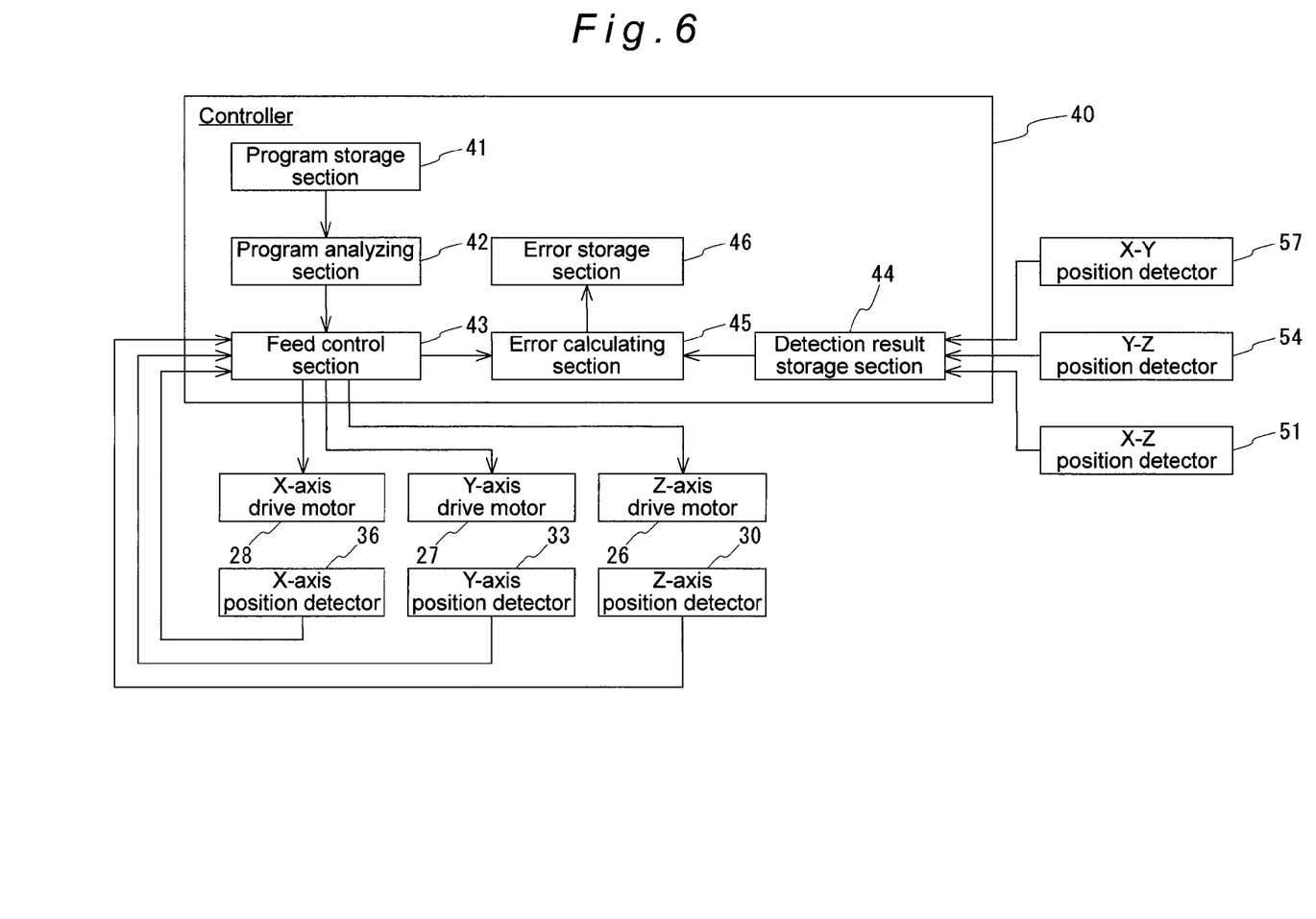
FIG. 6 is a block diagram showing a schematic configuration of a controller, position detectors and other components according to another embodiment of the present invention.

For example, motion errors of the spindle head 15, saddle 17 and table 18 may be calculated on the basis of the data stored in the detection result storage section 44. In this case, as shown in FIG. 6, the controller 40 further has an error calculating section 45 and an error storage section 46. The error calculating section 45 evaluates the difference between the data stored in the detection result storage section 44 (the positions of the spindle head 15, saddle 17 and table 18 in the Z-axis, Y-axis and X-axis directions respectively) and the target moving positions thereof or the positions thereof detected by the Z-axis, Y-axis and X-axis position detectors 30, 33, 36, and thereby calculates motion errors of the spindle head 15, saddle 17 and table 18. The calculated motion errors are stored in the error storage section 46. In this way, the motion errors can be accurately calculated.

Further, at the time of machining a workpiece W, correcting, when moving the tool T and the workpiece W in the three orthogonal directions, the positions of the spindle head 15, saddle 17 and table 18 on the basis of the calculated motion errors leads to the workpiece W being machined with higher accuracy.

The above correction is preferably performed in the following manner, for example. That is, a three-dimensional error map is generated on the basis of the calculated motion errors, the detection values detected (by the Z-axis, Y-axis and X-axis position detectors 30, 33, 36, i.e. position data to be fed back to the feed control section 43 from the Z-axis, Y-axis and X-axis position detectors 30, 33, 36 are corrected by an error correcting device on the basis of the generated error map, and the Z-axis, Y-axis and X-axis drive motors 26, 27, 28 are controlled by the feed control section 43 on the basis of the corrected data. Further, during the operation of the machine tool 1, the motion errors are monitored by a system for identifying error repetition, and when the system judges that the motion errors used in the three-dimensional error map are not repeated, motion error information is renewed and the three-dimensional error map is reconfigured.

Furthermore, when a measuring head replaces the tool T and is mounted to the spindle 16 and a measuring probe thereof is approached to a machined workpiece W on the table 18 and is brought into contact with the workpiece W, and the positions of the spindle head 15, saddle 17 and table 18 at the time when the measuring probe is brought into contact with the workpiece W are detected by the Z-axis, Y-axis and X-axis position detectors 30, 33, 38 to calculate the shape accuracy of the workpiece W on the basis of the detected positions, a three-dimensional error map is generated on the basis of the calculated motion errors, the detection values detected by the Z-axis, Y-axis and X-axis position detectors 30, 33, 36 at the time when the measuring probe is brought into contact with the workpiece W are corrected by an error correcting device on the basis of the generated error map, and position data after the correction is used as measurement values, whereby on-machine measurement can be performed with high accuracy. It is noted that during the measurement, similarly to the above, the motion errors are monitored by a system for identifying error repetition.

In the above embodiment, the X-Z, Y-Z and X-Y position detectors 51, 54, 57 each detect positions in two directions. However, instead of these detectors 51, 54, 57, three detectors detecting a position only in one direction may be provided to detect positions in three orthogonal directions.

Further, although in the above embodiment, the Z-axis, Y-axis and X-axis position detectors 30, 33, 36 are each configured with a linear encoder, they may be each configured with a rotary encoder. In addition, the measurement frame 50 may be configured so that vibration is isolated so as not to be transmitted thereto.

Furthermore, in the above embodiment, the X-Z position detector 51 detects a position in the X-axis direction and a position in the Z-axis direction, the Y-Z position detector 54 detects a position in the Y-axis direction and a position in the Z-axis direction, and the X-Y position detector 57 detects a position in the X-axis direction and a position in the Y-axis direction. By configuring the X-Z reader 53, the Y-Z reader 56 and the X-Y reader 59 so that they can detect a position in the Y-axis direction, a position in the X-axis direction and a position in the Z-axis direction, respectively, it becomes possible to calculate motion errors with 6 degrees of freedom.

Figure 7:
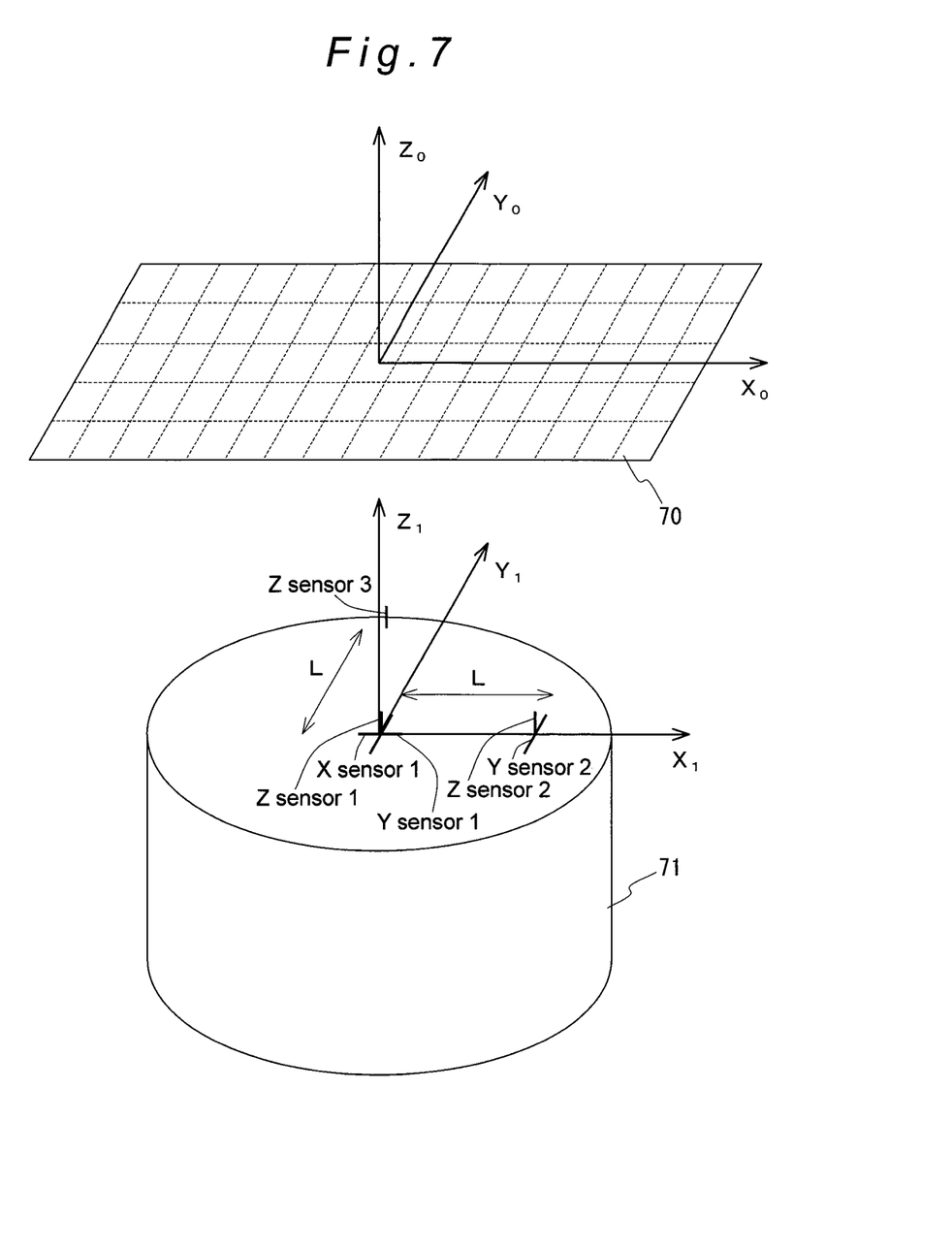
FIG. 7 is an illustration for explaining the relationship between a scale and a reader.

As shown in FIG. 7, assuming that: a coordinate system set on a scale 70 is $(X_0, Y_0, Z_0)$; a coordinate system set on a reader 71 is $(X_1, Y_1, Z_1)$; an output of an X sensor 1 is $x+\Delta x_1$; an output of a Y sensor 1 is $y+\Delta y_1$; an output of a Z sensor 1 is $h+\Delta z_1$; an output of a Y sensor 2 is $y+\Delta y_2$; an output of a Z sensor 2 is $h+\Delta z_2$; and an output of a Z sensor 3 is $h+\Delta z_3$, rotation of the reader 71 with respect to the scale 70 is expressed as follows. That is, its rotation about the X axis is expressed by $(\Delta z_3 - \Delta z_1)/L$, its rotation about the Y axis is expressed by $(\Delta z_2 - \Delta z_1)/L$, and its rotation about the Z axis is expressed by $(\Delta y_2 - \Delta y_1)/L$. It is noted that x, y each indicate a nominal position, h indicates a nominal clearance between the scale 70 and the reader 71, and $\Delta x_1, \Delta y_1, \Delta z_1, \Delta y_2, \Delta z_2$ and $\Delta z_3$ each indicate a deviation between an actual motion and a nominal motion.

The homogeneous transformation matrix between the coordinate system $(X_1, Y_1, Z_1)$ and the coordinate system $(X_0, Y_0, Z_0)$ is expressed by the following equation (Equation 1).

$$T = \begin{bmatrix} 1 & -(\Delta y_2 - \Delta y_1)/L & (\Delta z_2 - \Delta z_1)/L & x + \Delta x_1 \\ (\Delta y_2 - \Delta y_1)/L & 1 & -(\Delta z_3 - \Delta z_1)/L & y + \Delta y_1 \\ -(\Delta z_2 - \Delta z_1)/L & (\Delta z_3 - \Delta z_1)/L & 1 & h + \Delta z_1 \\ 0 & 0 & 0 & 1 \end{bmatrix} \quad \text{Equation 1}$$

Further, assuming that: the homogeneous transformation matrix relating to a reader 71 is $T_2$; the positional relationship between the table 18 and a reader 71 corresponding thereto is $T_1$; and the relationship between the spindle 16 and a reader 71 corresponding thereto is $T_3$, the spatial relationship between the spindle 16 and the table 18 is expressed by multiplication of these homogeneous transformation matrixes $T_1$, $T_2$, $T_3$. In this way, motion with 6 degrees of freedom including errors can be obtained.

REFERENCE SIGNS LIST

1 Machine tool
11 Bed
12 Column
15 Spindle head
16 Spindle
17 Saddle
18 Table
30 Z-axis position detector
33 Y-axis position detector
36 X-axis position detector
40 Controller
50 Measurement frame
51 X-Z position detector
52 X-Z scale
53 X-Z reader
54 Y-Z position detector
55 Y-Z scale
56 Y-Z reader
57 X-Y position detector
58 X-Y scale
59 X-Y reader

CITATION LIST

Patent Literature

Japanese Unexamined Patent Application Publication No. 2008-114322

What is claimed is:

1. A machine tool comprising:
 a first support structure including a bed and a portal column fixedly provided on the bed, the column having a pair of posts provided on either side of the bed respectively and a cross beam extending between the pair of posts;
 a tool mounting mechanism including a spindle head provided on the cross beam to be movable in a first axis direction being the vertical direction, and the tool mounting mechanism further including a spindle which is supported by the spindle head in such a manner that a rotation axis of the spindle is parallel to the first axis direction, and to which spindle a tool is mounted;

a workpiece mounting mechanism including a saddle provided on the bed to be movable in a second axis direction being a horizontal direction, and the workpiece mounting mechanism further including a table which is provided on the saddle to be movable in a third axis direction being a horizontal direction perpendicular to the second axis direction, and to which table a workpiece is mounted;

a feed mechanism moving the spindle head, the saddle and the table in the first, second and third axis directions, respectively;

a first position detecting mechanism detecting the position of the spindle head in the first axis direction, the position of the saddle in the second axis direction and the position of the table in the third axis direction; and a controller which feedback controls the feed mechanism on the basis of target moving positions of the spindle head, saddle and table in the first, second and third axis directions, respectively, and on the basis of the positions thereof detected by the first position detecting mechanism, to move the spindle head, the saddle and the table to their respective target moving positions, wherein the saddle has a through hole passing therethrough in the vertical direction within a moving area of the table;

wherein the machine tool further comprises:

a second support structure that is configured with a rectangular and frame-shaped member and that is disposed on the bed in such a manner that the vertical edges and lateral edges of the rectangular and frame-shaped member extend along the first axis direction and along the longitudinal direction of the cross beam, respectively, and the saddle and the table are positioned within the rectangular and frame-shaped member; and a second position detecting mechanism including a first scale having graduations in the first axis direction and provided on the spindle head, a second scale having graduations in the second axis direction and in the third axis direction and provided on the lower surface of the table, a first reader provided on the second support structure in the vicinity of the spindle head and reading the graduations of the first scale, and a second reader provided on the second support structure at a portion thereof corresponding to the through hole and below the table and reading the graduations of the second scale.

2. The machine tool according to claim 1, wherein the scales and the readers are disposed in the vicinity of a cutting point, the cutting point being a contact point between the tool and the workpiece.

3. The machine tool according to claim 1, wherein the second reader is disposed below the spindle.

4. The machine tool according to claim 1, wherein
the first scale having graduations in the first axis direction also has graduations in the second axis direction,
wherein the second position detecting mechanism further comprises:
a third scale having graduations in the first axis direction and in the third axis direction and provided on the spindle head; and
a third reader provided on the second support structure in the vicinity of the spindle head and reading the graduations of the third scale.

5. The machine tool according to claim 1, wherein the second support structure is configured with a member having a coefficient of linear expansion of $1.5 \times 10^{-6}/°C$.

6. The machine tool according to claim 4, wherein the second support structure is configured with a member having a coefficient of linear expansion of $1.5 \times 10^{-6}/°C$.

* * * * *